United States Patent [19]

Viel

[11] Patent Number: 4,755,245
[45] Date of Patent: * Jul. 5, 1988

[54] METHOD FOR CONDITIONING A PERMANENT ADHESIVE COMPOSITION IN THE FORM OF BLOCKS OR SECTIONS

[75] Inventor: Gerard H. Viel, Crepy En Valois, France

[73] Assignee: Societe Nouvelle Raffinerie Meridionale de Ceresines, Drancy, France

[*] Notice: The portion of the term of this patent subsequent to Jun. 7, 2005 has been disclaimed.

[21] Appl. No.: 877,183

[22] Filed: Jun. 20, 1986

Related U.S. Application Data

[63] Continuation of Ser. No. 680,261, filed as PCT FR84/00045 on Feb. 29, 1984, published as WO84/03468 on Sep. 13, 1984, abandoned.

[30] Foreign Application Priority Data

Mar. 1, 1983 [FR] France .................. 83 03387

[51] Int. Cl.⁴ .............................. B29C 41/08
[52] U.S. Cl. .................... 156/227; 156/245; 156/289; 156/292; 264/24; 264/255; 264/264; 264/268; 264/297.6; 264/297.8; 427/28; 427/133; 427/203
[58] Field of Search ............. 264/24, 255, 264, 265, 264/267, 268, 130, 131, 22, 297.1, 297.6, 297.8, 250; 427/27, 28, 33, 26, 202, 208.9; 53/401, 428, 411, 440, 472; 156/289, 245, 292, 297, 227

[56] References Cited

U.S. PATENT DOCUMENTS

3,165,567  1/1965  Olson .................................. 264/255
3,278,656  10/1966  Dicks et al. ......................... 264/24
3,528,841  12/1970  Donaldson et al. .

Primary Examiner—Jan H. Silbaugh
Assistant Examiner—Mary Lynn Fertig
Attorney, Agent, or Firm—Mason, Fenwick & Lawrence

[57] ABSTRACT

An open-topped casting mold and a matching mold are hingedly connected and are electrostatically coated with a powder screen; casting material is then poured into the molds without disturbing the powder by holding the powder in position with static electricity. The molds are pivoted together to provide a composite body of the hardened casting material formed by the bonding of the material from the two molds.

22 Claims, 3 Drawing Sheets

METHOD FOR CONDITIONING A PERMANENT ADHESIVE COMPOSITION IN THE FORM OF BLOCKS OR SECTIONS

This application is a continuation, of application Ser. No. 680,261, filed as PCT FR84/00045 on Feb. 29, 1984, published as WO84/03468 on Sep. 13, 1984, now abandoned.

DESCRIPTION

Method for packaging a permanent adhesive composition in the form of a block or section, apparatus therefor and packaged article obtained by implementing this method.

The present invention relates to a method for packaging a permanent adhesive material in the form of a block or section and, more particularly, to a method for packaging masses which can be melted by heat and physically have various shapes and are in a pasty, plastic, elastic, semi-solid or solid state, depending on their nature and their constituents.

The present invention also relates to an apparatus for implementing the said method, as well as to the various packaged articles resulting from this implementation.

During the course of numerous chemical and industrial activities, it is known, common and necessary to have to use permanent adhesive compositions, i.e. masses which, when cold, and more particularly at the normal handling temperature which is known to be close to 20° C., satisfy one or more of the following conditions:

intrinsic adhesiveness of the mass, surface adhesion or "tack" in normal temperature and pressure conditions, sensitivity to pressure, occurrence of a change in the surface state (adhesiveness) due to a natural rise in temperature (summer period for example).

The generic term "permanent adhesive compositions" thus includes the following:

(a) adhesive resins (colophane, coumarone-indene and aliphatic resins), (b) soft tacky waxes which develop a certain surface adhesiveness, (c) certain grades of polymers (polypropylenes, polyisobutylenes) and copolymers, (d) certain pitches and bitumens incapable of, i.e. unsuitable for, deformation, (e) pitches and bitumens modified by resins, plasticizers and elastomers, (f) certain elastomers, such as, for example, butyl rubber, (g) the various formulations of adhesive hot-melts, comprising at least one polymer, at least one natural or synthetic resin, one plasticizer and, if necessary, a filler, and (h) generally all products in their natural state and processed products containing, if appropriate, a filler, which develop adhesiveness, when cold, in accordance with the conditions defined above.

On account of the inherent nature of their adhesive properties when cold, it is obvious that the various compositions belonging to the above list must be protected both during handling and during transport or storage, so as to prevent them bonding together or else prevent impurities becoming attached to them.

To this end, numerous methods have been proposed and implemented in order to package permanent adhesive compositions and thus prevent them bonding together and prevent impurities becoming attached to them.

Firstly, it is known to package these types of composition in containers which have different volumes and shapes (small casks, boat-shaped receptacles and bags), the inner surface of which is lined with non-stick materials, such as special waxes, or more frequently coated with silicone-containing compositions. This method of protection, however, has the drawbacks that the containers are costly and that the user himself is required to remove the packaged masses from the molds.

Secondly, it is known to protect permanent adhesive compositions by packaging them in containers which have different volumes and shapes (small casks, drums and buckets), are generally cylindrical in shape, mostly metallic, and unprotected internally.

In this second method, the contents obviously adhere to the container. This second method of protection consequently has two obvious drawbacks: (a) in order to remove the contents so as to supply the applicators of the user, special means (heating plates or other devices ensuring fusion of the product and special delivery pumps) are required, all of this special equipment, i.e. heating plates, melters and special pumps, being very costly, and (b) the method of protection used gives rise to a considerable loss of protected material since a large amount of material is present on the walls of the container and in particular on the bottom of the latter and cannot be pumped off since it is stuck there.

Thirdly, it is known to package these types of composition in containers which have different volumes and shapes, but which, however, have smaller volumes, such as plates, in which there are cavities suitable for containing 100 to 1,000 grams of adhesive in block form. Such plates are made of a special plastic material such that the walls of the cavities have non-stick properties, and these plates are thus used to package the processed composition.

This method of protection also has two major drawbacks: (a) the high cost of containers of the plate type and (b) the need for the user himself to remove the articles from the molds, an operation which is often quite difficult particularly when the permanent adhesive compositions retract little or not at all during their change of state.

Fourthly, it is known to provide permanent adhesive compositions in the form of rods, blocks, miniature blocks, strips, sections and slabs, which are enveloped in a thin film usually made of polyethylene or polypropylene or of a compound of polyethylene and polypropylene. This method of wrapping using film is, however, also costly.

Furthermore, the choice of films suitable for such protection is fairly limited since, on the one hand, the films must not melt during casting of the composition to be covered which can be supplied at 160° C. and sometimes at a higher temperature, and since, on the other hand, it is absolutely essential that they blend perfectly with the composition during re-melting of the latter when used, as the protected composition from now on is inseparable from its protective film.

Finally, this fourth method, despite everything, remains limited to a few types of adhesive materials which can be melted by heat, since it is obvious that only those products whose viscosity is suitable for this principle can be covered.

Fifthly, it is known to coat, by advanced mixing in a powdery medium, pellets or blocks consisting of a material which can be melted by heat and which is slightly adhesive, namely atactic polypropylene. This method of protection by coating, however, has numerous drawbacks, including (a) the irregularity and general surplus of the powdery coating material, (b) the high percentage of this powdery protective material, especially in the case of coating pellets which have a high specific surface area, and (c) the problems which can arise from the application of atactic polypropylene thus coated, precisely because the coating material, which is known to be different from the coated material, represents a high and not insignificant percentage capable of impeding or disrupting the operations which the user must perform on the permanent adhesive composition thus protected.

The object of the present invention is to reduce all of the abovementioned drawbacks and, to this end, it proposes a packaging method and apparatus which make it possible to protect permanent adhesive compositions at a low cost, without having to remove the protected compositions from the molds when required for use, thus saving a considerable amount of time, without loss of material and without having to invest in special equipment for heating and/or transferring the protected compositions, and which, finally and above all, are very flexible since all of the permanent adhesive compositions mentioned in this text can be packaged and protected using the method and apparatus according to the invention.

A first subject of the present invention, therefore, is a method for packaging a permanent adhesive composition in the form of a block or section, the said method comprising the known stages of casting the said composition in a mold, in order to shape the packaged article, and protecting the said packaged article removed from the mold or transported still inside the mold, so as to prevent it, during storage and handling, sticking to another packaged article or prevent impurities becoming attached to it, wherein, before casting, a screen of powdery material is provided over the entire inner surface of the mold, wherein the said screen is kept coherent during the entire casting operation so that there is permanent mutual bonding of the grains of the powdery material, and wherein, after hardening and shaping, a packaged article is removed from the mold, all of the surfaces of the said packaged article which were previously opposite the inner surface of the mold being protected by the screen of powdery material.

By implementing such a method, it is obvious that each packaged and protected article is perfectly and completely enveloped by a screen of powdery material, the thickness of which is uniform and fine and in any case very precisely proportioned, so much so that the quantity of powdery material required for protection is small and represents a percentage, in relation to the coated composition, of which the user is fully aware.

Thus, the powdery material, if it is chemically inert, is unable to create problems when the permanent adhesive composition is applied. On the other hand, if the powdery coating material is chosen as having to form part of the formulation for which the permanent adhesive composition is intended, it can be applied in advance in the form of a protective screen in a quantity such that it will no longer be necessary to add any in order to complete the formulation, or else it will be provided in an insufficient but perfectly defined quantity so that it can be brought up to the ideal percentage when all of the other constituents belonging to the said formulation are subsequently added.

In a preferred method of implementation, the screen is provided before casting and kept coherent for the entire duration of bonding (sic) by electrostatic means. Using this method, it is clearly possible to form a powdery, uniform, homogeneous and continuous screen, whatever the shapes (hollow or raised) of the inner surface of the mold, thus ensuring the provision of a protective screen, the thickness of which is precisely related to the mass of the permanent adhesive composition to be packaged. Moreover, as a result of this method, it is possible to cast any permanent adhesive composition which can be melted by heat, without displacing nor deforming the screen of powdery material, since the latter is "fixed electrically".

In another variation in implementation, the screen is obtained by superimposing several layers of grains of powdery material, the outermost layers of which, if necessary, are recovered after removal of the composition from the molds.

As a result of this method, it is possible to use as little of the powdery material as possible for the protective screen and also reduce the percentage of this powdery material, in relation to the permanent adhesive composition which is completely coated, to the ideal value, if required.

In a variation of implementation, in which the permanent adhesive composition is cast in a mold, the upper part of which is open, the upper substantially horizontal surface of the packaged article which has been shaped is protected after hardening and before removal from the mold, either by sprinkling with grains of a powdery material identical to or different from that provided as the screen or by coating with a fatty liquid material.

In this variation, the powdery material intended to protect the upper surface of the packaged article is, as chosen by the user, identical to or different from that provided as the screen between the inner surface of the mold and the surfaces opposite the packaged article.

Another subject of the present invention is an apparatus for implementing the method as claimed above, which comprises a mold for casting the permanent adhesive composition and shaping the packaged article to be made from this composition, means for forming a screen of powdery material over the entire inner surface of this mold, means for keeping this screen coherent during the entire molding operation, and means for removing the packaged article from the mold so that all of the surfaces which were previously opposite the inner surface of the mold are protected by the screen of powdery material.

In a preferred embodiment, the apparatus also comprises means for grounding the mold, as well as means for providing each grain of the powdery material with a positive electrical charge.

In a first variation of embodiment, the apparatus comprises at least one mold consisting of two parts, called the base and lid respectively, over the entire inner surface of each of which a screen of powdery material is provided and kept coherent and which each receive a casting of the permanent adhesive composition.

In this case, the apparatus also comprises means for bringing together the two parts of the mold and bringing into contact the upper surfaces of each packaged half shaped in the two parts of the mold, and means for bonding the two packaged halves tightly together after, if necessary, reactivating their interface.

In another variation of embodiment, the apparatus according to the invention comprises a mold, the upper part of which is open, means for forming a screen of powdery material over the entire inner surface of this mold and keeping it coherent there, means for casting the permanent adhesive composition inside the mold whilst keeping the screen of powdery material perfectly coherent, means for protecting the substantially horizontal upper surface of the packaged article which has been shaped, either by sprinkling with grains of a powdery material or by coating with a fatty liquid material, and means for removing the thus totally protected and packaged article from the mold.

A third subject of the invention is a packaged article in the form of a block or section, consisting of a permanent adhesive composition and obtained by implementing any one of the methods claimed above, the said packaged article having externally, on its surface, a screen of powdery material, of fine and regular thickness, which perfectly and completely protects the permanent adhesive composition.

In another variation of embodiment, the packaged article has externally, on its surface, a screen of powdery material, of fine and uniform thickness, which protects perfectly all of the surfaces of the permanent adhesive composition, except for the upper surface of the block or section which it defines, the said upper surface itself being protected by coating with a fatty liquid material or by sprinkling with grains of a powdery material different from that which forms the screen.

Advantageously, the screen of powdery material, of fine and uniform thickness, which envelops all or only part of the permanent adhesive composition, is deposited and kept on the inner surface of the mold by the phenomenon of static electricity.

The material which forms this screen of powdery material is advantageously a part of the filler, in the special case where a filler must be added to the composition, or else all or part of one of the constituents of the ideal formulation, for example an antioxidant or a flame-retarding product.

So that the subject of the present invention can be better understood, a description is given below, by way of purely illustrative and non-limiting examples, of various forms of embodiment, with reference to the attached drawings in which.

With reference to the drawings, it can be seen that 1 designates in its entirety a mold with one or n chambers for shaping one to n blocks of a permanent adhesive composition, the mold consisting either of one part, which is open at the top (indicated by 2 in FIG. 1a), or of two parts, a base 3 and a lid 4 respectively, as can be seen in particular in FIG. 1b and FIGS. 2 to 4. The chambers are indicated respectively by 5 for the open mold 2, and by 6 and 7 for the base 3 and the lid 4 of the mold consisting of two parts. The said two parts are preferably the same and symmetrical, as is shown in the drawings, or, as a variation, different from each other, the lid being for example flat and the base defining on its own the chamber for shaping the block; as a result of this third variation of embodiment, it is possible to introduce, for example by injection, the permanent adhesive composition into the bottom chamber, the internal surfaces of the base and the lid having been protected beforehand by a powdery screen according to the invention, the lid simply being removed from the base after shaping and hardening of the block and the base being upturned so as to permit removal of the said block from the mold.

However, this third variation of implementation using a mold with two non-matching half-molds will not be described in detail because it is more complex to carry out, in particular with regard to the injecting operation which is known to be always more difficult to perform than a simple casting operation.

When each molding chamber 5, 6 and 7 is clean, electrostatic powdering of the said chamber is performed using any known method from a similar technique, for example that used for coating electrical cables or for painting radiators, bicycles and generally all objects with a complicated shape.

To this end, all of the parts 2, 3 and 4 of the mold are grounded, as indicated by 8, while the molds are sprayed using a gun or passed through a fluidization bed, so as to deposit on the internal surface of all the parts of the mold, by the phenomenon of static electricity, grains of a powdery material which are each provided with a positive electrical charge. The grains of the powdery material will have thus been provided with a very high electrical charge (+) using a high potential of the order of 20,000 to 80,000 volts, for example, thus resulting in their being strongly attracted to the internal surface of the chambers of the molds which form a pole with a sign opposite to that of all the charged grains.

It is obvious that, using this method, it is possible to form, as indicated by 9, a powdery, uniform, homogeneous and continuous screen which is relatively fine in thickness and in any case uniform whatever the shape (hollow, raised or recessed) of the chambers 5, 6 and 7 to be filled. Moreover, using this method of forming a powdery screen by electrostatic means, it is possible to determine a screen with a thickness of the order of 10 to 80 $\mu$, exactly related to the masses to be packaged.

Figure 1A:
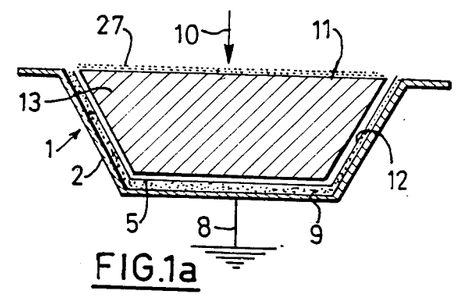
FIGS. 1a and 1b are schematic cross-sectional drawings of apparatuses permitting the implementation of the invention, and comprizing an open mold and a mold with two symmetrical parts, respectively.
Figure 1B:
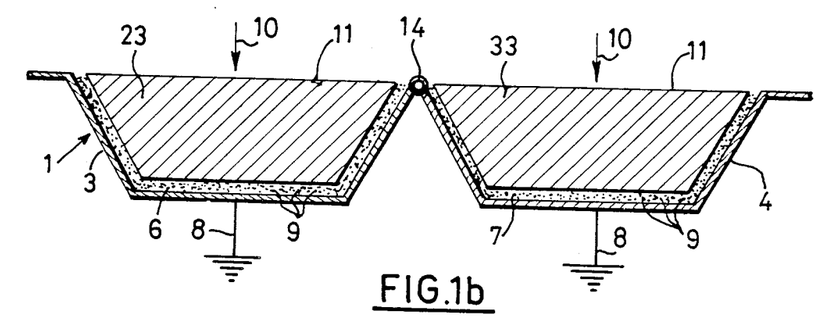
Figure 2:
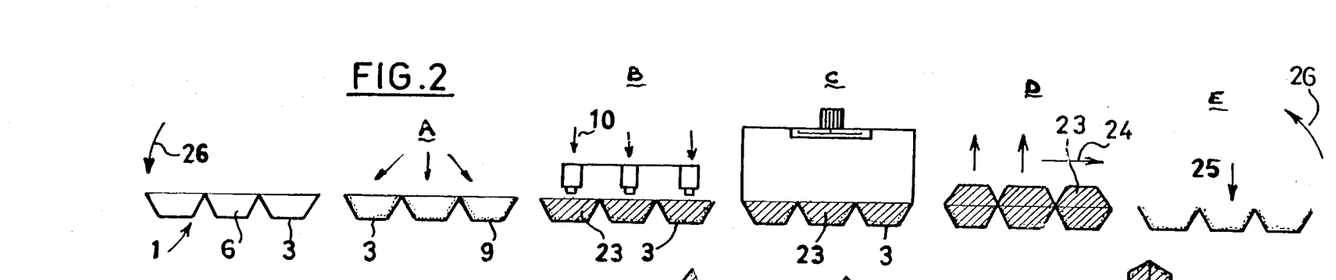
FIG. 2 is a longitudinal section through a packaging line using the molds shown in FIG. 1b.

After the operation of electrostatic powdering indicated by A in FIG. 2, there follows the operation of casting the permanent adhesive composition in all of the chambers of the molds, the internal surfaces of which are thus protected by a powdery screen. Casting of the composition, indicated by the arrows 10 in FIGS. 1 and 2, is determined volumetrically so that, in each chamber, the composition is substantially level with the top of the said chamber and forms there a surface plane 11 horizontal to the top of this chamber.

For the entire duration of the casting operation, the powdery screen 9, which has been "fixed electrically", therefore remains perfectly coherent, without the risk of dissociation, so much so that the permanent adhesive composition never comes into contact with the inner surface of the molds and therefore is in no danger of adhering to it (indicated by B in FIG. 2).

The grains of powdery material constitute, as it were, a screen with one layer or several superimposed layers, which is completely impermeable to the cast composition; this screen is thus represented by the thin continuous line 12 shown in FIG. 1a.

The blocks of material, 12, 23 and 33 respectively, thus formed in the chambers 5, 6 and 7, are cooled, for example, by the blowing of cold air, so as to accelerate their hardening and shaping (indicated by C in FIG. 2).

At this point, various methods for completing protection of the unfinished articles to be packaged can be used.

Figure 3:
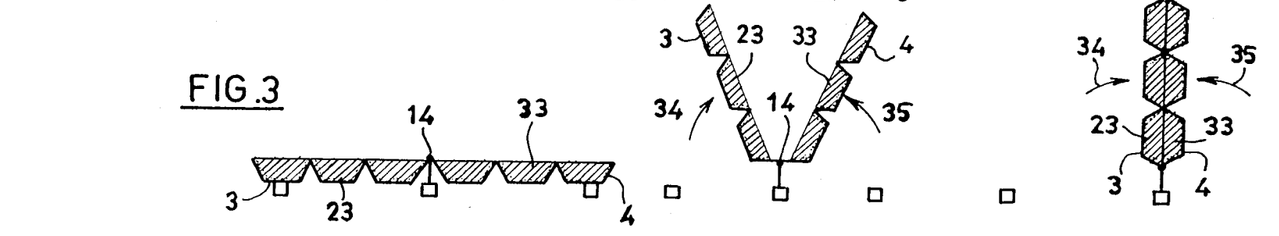
FIG. 3 is a detailed cross-sectional view of the operation for forming blocks consisting of a permanent adhesive composition by bonding two symmetrical packaged halves.
Figure 4:
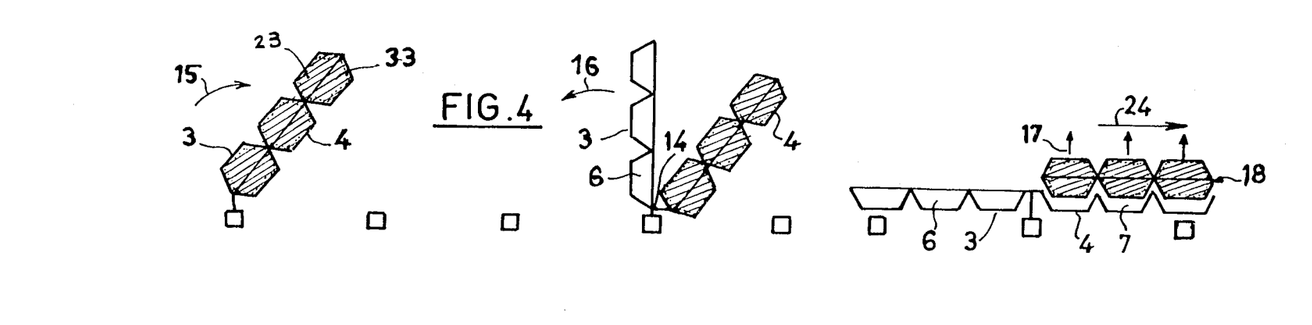
FIG. 4 is a detailed cross-sectional view of the operation involving removal of the blocks, obtained during the operation shown in FIG. 3, from the molds.

In the apparatus shown in FIGS. 2 to 4, in which the mold consists of two parts, care was taken to design the two said parts as two matching half-molds, the left-hand mold 3 and right-hand mold 4 respectively, which are both articulated about their longitudinal median axis 14. The two said half-molds are raised symmetrically about their common axis 14, as is indicated in particular by 34 and 35 in FIG. 3, which is a detail of FIG. 2, until they assume a new substantially vertical position in which the upper surfaces 11 of each packaged half, 23 and 33 respectively, come into contact and are bonded tightly together on account of the unprotected nature of the said surfaces.

After bonding together of the packaged halves, the blocks are removed from the molds by tilting the assembly consisting of the two half-molds, the left-hand one 3 and the right-hand one 4, in the direction of the arrow 15, then separating the left-hand half-mold from the right-hand half-mold by tilting and pivoting in an opposite direction about the axis 14, as indicated by the arrow 16, and finally removing the packaged articles in the form of blocks from the chambers 7 of the half-molds 4 using any suitable gripping means 17, the said processed articles each having been obtained by bonding the two packaged halves together via their bare upper surfaces, i.e. their surfaces which are not protected by the screen of powdery material.

Each block 18 thus obtained (FIG. 5) externally thus has the appearance of a mass of grains which, in reality, consists of a very fine simple screen (represented by the crosses 19) which envelops completely the two packaged halves 20 and 21 so that their interface 22 is barely visible.

Figure 5:
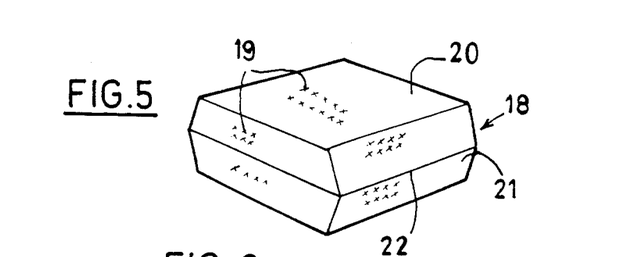
FIG. 5 is a perspective schematic view of a packaged article obtained from the apparatus shown in FIG. 1b and FIGS. 2 to 4.

Since this protective screen 19 covers completely each block 18 of adhesive material, it prevents any further sticking of the latter to another adhesive mass as well as any impurities becoming attached to it. Each block 18, therefore, can be transported, as is indicated by the arrow 24, towards a packing line, for example, where it is packed in cardboard boxes, or else towards a marking line where it receives all of the instructions relating to the coated composition (indicated by D in FIG. 2).

During the operation where the two upper surfaces 11 of the packaged halves 23 and 33 are stuck together, it may occur that the adhesiveness of each surface is insufficient to ensure definitive bonding of the two packaged halves. This will be the case, for example, when there has been excessive cooling during phase C or else when the adhesive nature of the materials is insufficient. In these two cases, it is merely required to reactivate superficially the surfaces 11, for example by supplying heat in the form of hot air, thereby enabling the material to change partially its surface state, become pasty and hence adhere better.

After removing the packaged articles 18 from the molds, the dust is removed from the chambers 6 and 7 of the half-molds 3 and 4, as is indicated by 25 in phase E of FIG. 2, and the said half-molds are brought back to the start of the packaging line, as is indicated by the arrow 26, where they are again protected internally by means of electrostatic powdering before being filled with fresh cast masses consisting of an adhesive composition.

The cycle: electrostatic powdering, fixing electrically, casting, cooling, contact between the two packaged halves via their bare horizontal upper surfaces so as to ensure bonding together, removal from the molds, removal of the dust from the empty molds, is performed again continuously on the packaging line shown in FIGS. 2 to 4.

Figure 6:
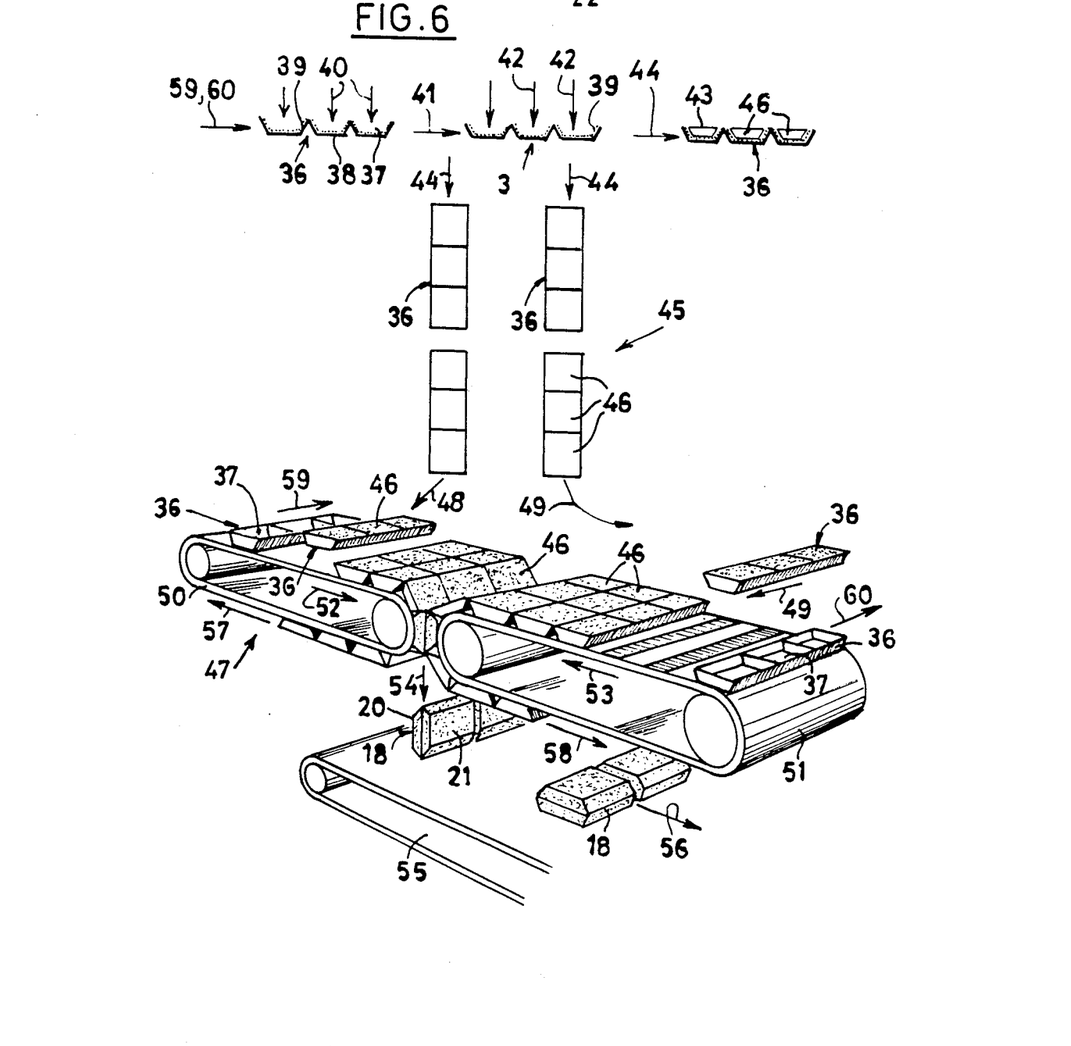
FIG. 6 is a perspective view of a variation of the apparatus, operating continuously in order to bond together the two packaged halves and then remove them from their molds.

In a second variation of embodiment of a line permitting the continuous packaging of self-protected adhesive masses, such as that shown in FIG. 6, the molds 36 each consist of several cavities 27 which have the shape of a truncated pyramid and the bottom 38 of which is the small base and the top of which is open. There are for example three cavities with the shape of a truncated pyramid, per mold 36.

During the first phase, the internal surfaces of each cavity 37—the bottom 38 and side walls - are protected by a screen 39 of powdery material which is deposited and kept coherent using any of the electrostatic methods described above. Electrostatic powdering is performed, for example, by spraying with a gun, the grains of powder being conveyed by air as far as the spray head, which itself is provided with a gun inside which each grain is positively charged using a high potential of the order of 20,000 to 80,000 volts and a very low current of the order of 2.5 microamperes. This operation of electrostatic powdering is indicated by the reference numbers 40.

Each mold 36 is then moved, in the direction of the arrow 41, from the powdering station to the casting station along the continuously operating line. Casting 42 of the adhesive composition is determined volumetrically so that the horizontal surface plane 43 of the cast mass of a composition is level with the top of each cavity 37. During the entire casting operation, the powdery screen 39, which is fixed electrically, has obviously retained completely its coherent nature, so much so that the adhesive mass is perfectly isolated from the walls of the cavity by the continuous and homogeneous screen 39.

From the casting station, the molds 36 are moved, in the direction of the arrow 44, towards a cooling station which is indicated in its entirety by the reference number 45. As they pass through this station, the cast masses 46 are cooled, for example by the blowing of fresh air or by passing the molds through a cooling channel, so as to accelerate the hardening and permanent shaping of each packaged mass.

Advantageously, the molds 36, which are absolutely identical to each other, move in twos along the cooling station so as to supply as uniformly as possible the bonding station indicated in its entirety by 47.

At this moment, the force of attraction of the grains of the powdery screen 39 with respect to the walls of each cavity 37 is lessened and even becomes nonexistent, whereas the adhesiveness of the cast composition 46 increases. Thus, the screen of powdery material gradually detaches itself from the inner surface of the cavity and adheres preferentially to the surface of the cast mass, thereby protecting it. The removal of each cast mass from its mold and the bonding of the cast mass, via its bare upper surface, to another packaged half which is exactly the same can therefore be performed without difficulty.

To this end, the molds 36, which are cooled in pairs, supply, in the direction of the arrows 48 and 49, a conveyor consisting of two symmetrical belts, 50 and 51 respectively, which are placed end to end. The belts 50 and 51 perform two movements which are rectilinear, equal in speed and opposite in direction, as indicated by the arrows 52 and 53 respectively, such that, in the zone where the belts meet, the said movements are symmetrical and in a downwards direction.

The full molds 36 are located alongside each other on each belt 50, 51 and therefore move forwards at the same speed towards the zone where the ends of the belts meet and where the bare upper surfaces 43 of two packaged halves filling two opposite cavities 37 come into contact with each other under pressure.

At the end of the downwards movement, after two opposite packaged halves have come into contact with each other under pressure, the blocks 18 of an adhesive composition, which are totally and perfectly coated with the screen of powdery material, fall under the effect of gravity, in the direction of the arrow 54, onto a conveyor belt 55 which transports the said blocks, in the direction of the arrow 56, towards a packing or marking station.

At the same time, the empty half-molds 36, which, for example, are held magnetically on the belts 50 and 51, are conveyed from the bottom sides of the belts to the top sides, in the directions indicated by 57 and 58 respectively, then ejected, in the directions indicated by 59 and 60 respectively, and brought back, after cleaning, to the station where electrostatic powdering is performed.

The abovementioned operations are carried out according to the complete cycle described above.

In the device shown in FIG. 1a, in which the mold consists of a single part and opens upwards, it is obvious that, after casting 10 followed by hardening inside the mold containing the mass 13 of an adhesive composition, the upper horizontal surface of this mass 13 is not protected and is therefore sticky. In such an embodiment, the surface 11 of the block 13 is protected, before the packaged article is removed from the mold, either by coating with a fatty liquid material such as that which is marketed under the tradename "Teepol", or by sprinkling (by means of spraying with a gun or by means of a screen supplied by a screw-type distributing device or an electrostatic distributing device) with grains 27 of a suitable powder, which can be the same as that used for formation of the screen 9 or different from this protective screen, whilst belonging to a range of materials which are also compatible with the adhesive composition for the applications envisaged by the user.

In this context, the powdery materials used to make the protective screens 9, and if necessary 27, will advantageously have the following properties:

they are suitable in the natural state, or after treatment, for the electrical charge required for electrostatic spraying, they preferably can be melted, they are compatible with the packaged adhesive composition, they do not modify the intrinsic properties of this composition as regards its typical features, such as the viscosity and solidification point.

Numerous powdery materials which are mineral, organic, organometallic or vegetable are suitable in this respect, including:

calcium carbonate and bentonite which, when incorporated in a formulation, decrease the price of the composition, barium sulfate, which makes the adhesive mass radio-detectable, titanium oxide and zinc oxide, which represent the most important fillers in the composition, antimony oxide, for making the composition flame-resistant, talc, which is used to control the tack of the formulation, and chalk, colloidal silicas and others, hard waxes, polyethylene waxes, modified polyethylene waxes, a polymer in powder form (polyethylene, polypropylene, EVA), a hot-melt or a resin in powder form, an anti-oxidant or an anti-UV agent, for example a phenol derivative, a natural gum (gum arabic), starch, bonemeal, guar flour.

The quantity of powdery material which protects any block 13 or 18 or any section resulting from implementation of the method described above, constitutes in theory a minute quantity in weight compared to the protected mass of the adhesive composition. Whether application of this powdery material results from formation of the screen 19 by electrostatic means or whether it results from formation of the screen 27 by sprinkling, it is thus of considerable advantage for the quantity of material constituting the screen 19 and/or the screen 27 to be proportioned very precisely in relation to the weight of the packaged mass, in particular if the material forming the screen 19 and/or the screen 27 is not an inert filler and, for example, has the function of protecting the adhesive composition (anti-oxidant, anti-UV agent or flame-retarding agent) or of simplifying its use by the end user (plasticizer). It is therefore desirable, in certain applications, for the quantity of material constituting the screens 19 and/or 27 to be proportioned as precisely as possible. To this end, one solution consists in forming the screen 9 by superimposing screens of reduced thickness, i.e. by the successive application (using the gun-spraying or fluidization technique) of grains of powdery material which, since they are all fixed electrically, then bind together to form a homogeneous film with a thickness which is greater and also easier to determine with precision than the thickness of a screen resulting from a single operation involving spraying with a gun or fluidization.

In the case where there is a surplus quantity of grains of powdery material used to form the screen 19 and/or the screen 27 in one or more layers and where this surplus prevents subsequent handling operations being properly carried out, the said surplus quantity is recovered, after removal of each block 13, 18 from the molds, from the outermost layers and, if necessary, is recycled for other electrostatic powdering operations, in particular in the case where the protective material in question has a high price per unit of volume.

It is obvious that removal of the outermost layer or layers of the screen 19 and/or of the screen 27 will never affect the layer which is directly in contact with the packaged material, the said layer being irreversibly bonded to the said material on account of the intrinsic properties of adhesiveness of the latter.

From the above description it can be seen that implementation of the method according to the invention has several advantages compared to the methods of the prior art which were summarized in the preamble.

Thus, with respect to the first method of protection mentioned in the preamble, the invention has the advantage of decreasing considerably the cost of packaging (container no longer required) and of eliminating all the operations relating to removal of the molds at the time of use, thereby achieving a considerable saving in time.

Compared to the second method, the invention avoids any loss of material and does not require the user to invest in special material and equipment for transfer of the packaged article.

Compared to the third method mentioned, the invention has the advantage of reducing the cost of packaging, by substituting a protective screen of powdery material for the packages in the form of plates made of a special treated non-stick material, and of eliminating the operations involving removal of the packaged articles from the molds, since, when required for use, the adhesive composition provided in the form of a block 18, 13 or a section is used as it stands.

With respect to the fourth method, the invention permits a great deal of flexibility on account of the wide choice as to the nature and properties of the powder intended to form the protective screen. Moreover, as a result of the invention, it is possible to package almost all of the permanent adhesive compositions described here. In practice, the invention applies to protection, by means of isolation, of all adhesive compositions, except for those which flow excessively since, in the event of excessive variation in the initial shape of the block or section, it is not certain whether the powdery protective screen will remain uniformly distributed.

Compared to the fifth method, the invention makes it possible to package all adhesive compositions, whatever the adhesive properties of these compositions. Moreover, the method according to the invention ensures perfect uniformity and perfect homogeneity of the powdery protective layer, which cannot be guaranteed by the coating method performed in a mixer. Finally, for similar protected masses consisting of an adhesive composition, the method according to the invention ensures a considerable reduction in the mass of powdery material required to form effective protective screens, i.e. the method according to the invention requires a quantity of powdery material which is approximately thirty times less than that of the method for coating pellets of atactic polypropylene. Furthermore, since the quantity of powdery material required to ensure a good degree of protection represents a minute quantity of the protected mass, according to certain applications of the present invention, it is possible to use for this screen a material belonging to the ideal final formulation; on the other hand, the fact that a large quantity of powdery material is required to protect the atactic polypropylene pellets excludes straight away that the protective material in question can belong to the ideal formulation, except as a filler.

Obviously, the invention is not limited to the methods of application nor to the embodiments which have been mentioned and different variations are possible without, however, departing from the scope of the said invention.

This is particularly the case as regards the form of the mold which can consist of two or more than two parts, the latter moreover being integral and articulated with each other or else separate and in this case capable of being assembled by means of snap engagement, fastening with bolts or screws or using any other method. Thus, the base may have for example a height which is different from that of the lid, the main thing being that the bare upper surfaces of each packaged half, obtained after hardening, in this base and in this lid respectively, should be the same so that they can be stuck to one another so as to form a smooth block.

The same applies to the molds which can be used for casting by means of injection. In this case, the mold consists of a base in the form of a bowl and of a flat lid, the said base and the said lid being joined by a fastening with screws or bolts before injection takes place, so as to resist the pressure exerted by the injected product. The injection orifice is provided in the middle of the lid or in the upper part of one of the side walls of the bowl forming the base.

Such a design consisting of a hollow base and a flat lid can also be used for the conventional casting operation where the composition to be packaged is cast simply by means of gravity, the mold in this case being open at the time of casting, whereas the inner surfaces of the base and the lid are protected by powdering, the lid then being lowered onto and rigidly fixed to the base so that the upper surface of the cast mass is protected in an identical manner to that of its other surfaces.

The base and the lid are separated after hardening and shaping of the cast mass provided with a protective screen.

I claim:

1. A method for packaging a permanent adhesive composition in a mold having an interior surface, said method comprising the steps of:
   providing an open top casting mold;
   providing by electrostatic coating a screen of powdery material over the entire surface of the mold;
   casting the composition in the mold to form a block, the electrostatic coating being such as to maintain the coherence of the screen during casting;
   cooling the cast block to cause that part of the screen adjacent the block to become part of the block, whereby a packaged article is formed in which all of the surfaces opposite the interior surface of the mold are protected by the screen and the surface corresponding to the open top of the mold is unprotected;
   protecting the unprotected surface; and
   removing the packaged article from the mold.

2. The method of claim 1, wherein the mold comprises two symmetric parts, each having a chamber with an interior surface and joined one to the other around a common axis;
   wherein in said screen-providing step, the screen is provided electrostatically over the entirety of the interior surface of each part;
   wherein in said casting step, the adhesive composition is poured into the chamber of each part until it forms an even surface level with the highest part of each chamber to form a half-block, the screen being held coherent with the walls of the chambers throughout the entire casting process by means of static electricity;

wherein in said cooling step, the half-blocks are cooled in their respective chambers; and wherein said protecting step comprises bringing together the two parts of the mold until the two unprotected surfaces of the half-blocks meet, whereby the two half-blocks are adhered one to the other, and a packaged article entirely coated in grains is produced from the mold.

3. The method of claim 1, wherein the mold is formed of several cells each having an interior surface;

wherein in said screen-providing step, a screen is provided over the entirety of the interior surface of each cell;

wherein in said casting step, the adhesive composition is poured until it reaches a level even with the highest point of each cell to form a half-block, the screen being held coherent with the walls of the cells throughout the entire casting process by means of static electricity;

wherein in said cooling step, the half-blocks contained in the cells are cooled; and wherein said protecting step comprises placing opposite the mold another identical mold, in which the cells are filled with identically cast half-blocks, bringing together the unprotected surfaces of the half-blocks, and pressing the two molds to adhere with all the half-blocks facing each other, whereby packaged articles entirely coated with grains are produced from the molds.

4. The method of claim 2, further comprising the step of superficially reactivating the unprotected surfaces in order to partially change the unprotected surfaces of the cast material, prior to said bringing-together step.

5. The method of claim 3, further comprising the step of superficially reacting the unprotected surfaces in order to partially change the unprotected surfaces of the cast material, prior to said bringing-together step.

6. The method of claim 1, wherein said protecting step comprises sprinkling the unprotected surface of the packaged article with grains of a powdery material identical to that provided as a screen between the interior surface of the mold and the surfaces opposite the package article to protect it.

7. The method of claim 1, wherein said protecting step comprises sprinkling the unprotected surface of the packaged article with grains of a powdery material different from that provided as a screen between the interior surface of the mold and the surface opposite the packaged article to protect it.

8. The method of claim 1, wherein said protecting step comprises coating the unprotected surface of the block with a fatty liquid material to protect it.

9. The method of claim 1, wherein in said screen-providing step, the screen is obtained by superimposing several layers of grains of powdery material.

10. The method of claim 1, wherein in said screen-providing step, the powdery material comprises the full amount of at least one of the constituents of the formulation for which the permanent adhesive composition is intended, whereby the formulation is complete.

11. The method of claim 6, wherein in said screen-providing step, the powdery material comprises the full amount of at least one of the constituents of the formulation for which the permanent adhesive composition is intended, whereby the formulation is complete.

12. The method of claim 7, wherein in said screen-providing step, the powdery material comprises the full amount of at least one of the constituents of the formulation for which the permanent adhesive composition is intended, whereby the formulation is complete.

13. The method of claim 9, wherein in said screen-providing step, the powdery material comprises the full amount of at least one of the constituents of the formulation for which the permanent adhesive composition is intended, whereby the formulation is complete.

14. The method of claim 1, wherein in said screen-providing step, the powdery material comprises an insufficient but perfectly defined part of at least one of the constituents of the formulation for which the permanent adhesive composition is intended, whereby the quantity of powdery material can be brought up to the ideal percentage when all the other constituents of the formulation are subsequently added.

15. The method of claim 6, wherein in said screen-providing step, the powdery material comprises an insufficient but perfectly defined part of at least one of the constituents of the formulation for which the permanent adhesive composition is intended, whereby the quantity of powdery material can be brought up to the ideal percentage when all the other constituents of the formulation are subsequently added.

16. The method of claim 7, wherein in said screen-providing step, the powdery material comprises an insufficient but perfectly defined part of at least one of the constituents of the formulation for which the permanent adhesive composition is intended, whereby the quantity of powdery material can be brought up to the ideal percentage when all the other constituents of the formulation are subsequently added.

17. The method of claim 9, wherein in said screen-providing step, the powdery material comprises an insufficient but perfectly defined part of at least one of the constituents of the formulation for which the permanent adhesive composition is intended, whereby the quantity of powdery material can be brought up to the ideal percentage when all the other constituents of the formulation are subsequently added.

18. The method of claim 1, wherein in said screen-providing step, the powdery material comprises in excess of the full amount of at least one of the constituents of the formulation for which the permanent adhesive composition is intended.

19. The method of claim 6, wherein in said screen-providing step, the powdery material comprises in excess of the full amount of at least one of the constituents of the formulation for which the permanent adhesive composition is intended.

20. The method of claim 7, wherein in said screen-providing step, the powdery material comprises in excess of the full amount of at least one of the constituents of the formulation for which the permanent adhesive composition is intended.

21. The method of claim 9, wherein in said screen-providing step, the powdery material comprises in excess of the full amount of at least one of the constituents of the formulation for which the permanent adhesive composition is intended.

22. A method for packaging a permanent adhesive composition in a mold having two unsymmetrical parts, namely a base forming a chamber having an interior surface and an open top and a lid, said method comprising the steps of:

providing a coherent screen of powdery material over the entire interior surface of the chamber and over the entire interior surface of the lid by an electrostatic coating process;

casting permanent adhesive composition in the chamber to form a block, while maintaining the coherent nature of the screen during casting;

positioning the lid over the chamber to close the chamber while maintaining the coherent screen of powdery material formed over the interior surface of the said lid;

cooling the block to cause that part of the screen adjacent the block to become part of the said block, whereby a packaged article is formed in which all of the surfaces opposite the interior surface of the chamber and of the lid are protected by the screen;

opening the lid; and removing the packaged article from the mold.

* * * * *